United States Patent Office 3,234,307
Patented Feb. 8, 1966

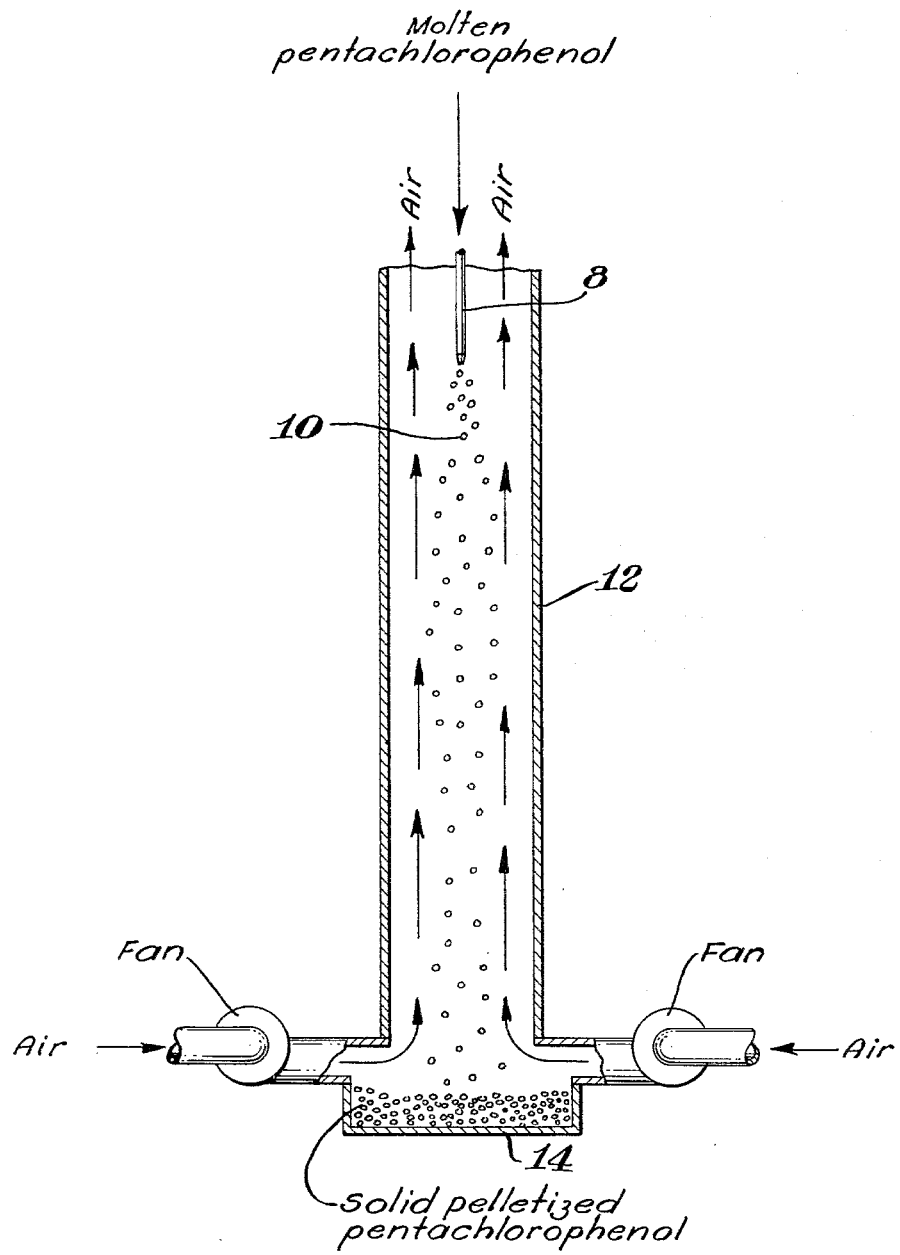

3,234,307
PROCESS FOR PREPARING PELLETS OF
SUBSTITUTED PHENOLS
Fred C. Tuttle, Midland, Mich., assignor to The Dow
Chemical Company, Midland, Mich., a corporation of
Delaware
Filed Oct. 3, 1962, Ser. No. 228,014
10 Claims. (Cl. 264—14)

This invention relates to a method of forming pellets, and more specifically concerns a method of preparing pellets of substituted phenols.

Phenolic materials, particularly the substituted phenols which are solid at room temperature are commercially handled as solids in flake form or sometimes as pressed pellets. The flakes made from technical grade start materials, particularly in the case of pentachlorophenol, exhibit upon storage a crystaline growth thereon which upon handling tends to form a noxious dust. The flake product also tends to conglomerate into large masses which are not easily broken up. It has now been discovered that by introducing molten droplets of various substituted phenol compounds, which are solid at room temperature, into a column of upwardly moving cool air, solid pellets of such compounds are obtained having a substantially reduced superficial crystaline growth, exhibiting little tendency to conglomerate when compacted.

The object of the present invention therefore, is to provide a method of pelleting substituted phenols. A related object is to produce such pellets which are, upon storage, substantially free of dust-forming superficial crystaline growth and which exhibit little tendency to conglomerate upon being compacted.

Illustrated in the accompanying drawing is one embodiment of the present invention.

In practicing the invention with reference to the drawing, a molten substituted phenol compound, which is solid at rom temperature, such as, for example, p-tert-butylphenol or pentachlorophenol, is introduced, by some means known to the art such as, for example, a nozzle 8, as uniform droplets 10 of the desired pellet size, downwardly into a vertical column 12 of about 40 to about 100 feet in height against an upward air flow (indicated by arrows) generated by fans from the bottom of the column. The droplets as they descend the column length are cooled and solidified by the upward air flow, said air flow, in addition, acting to cushion the pellet impact at the bottom of the column. Substantially all of the pellets exit at the bottom 14 of the column as solid, relatively dry, partially hollow, sperical balls, and are collected and used, or stored. Further, the pellets are obtained with a minimum of loss due to evaporation during solidification.

The molten compound to be pelletized may be introduced by any suitable means, for example, spraying, such that the desired resulting pellet size is obtained. In practice it has been found desirable to maintain the temperature of the molten compound not more than about 10 centigrade degrees above its melting point. The column used may be constructed using a suitable material sufficient to structurally contain and direct the upward air flow and support any structures attached thereto. One means which can be used to provide an upward air flow is by a conventional fan equipped to regulate its movement of air. Similarly, such a fan may also be used at the top of the column to assist in ejecting the air therefrom. The temperature of the upward flow of air should be substantially less than that of the molten material to be solidified. For example, an air temperature below about 29° C. was found to be desirable. Temperatures lower than about minus 10° C. may be used but no advantage is to be gained by the use of lower temperatures. A sufficient air flow rate was found to be about 3 feet per second.

It is understood that the droplet size, length of column, and upward air flow velocity and temperature can be adjusted in relation to one another to accomplish the desired rate of droplet cooling and spherical quality of the resulting solidified, partially hollow, pellet or ball. Also the column height may be decreased or increased to obtain proper droplet cooling depending on the ambient temperature of the upward air flow.

The present invention may further be understood from the following examples.

Example I

About 500 grams of p-tert-butylphenol in flake form was melted at a temperature of about 110° C. and placed in a closed container under a pressure of about 10 p.s.i., with continued heating to maintain the molten state. Using a conventional spray nozzle the molten material was sprayed downward into a column as an air flow was directed upward therethrough. The descending droplets solidified into uniform spherical, partially hollow balls, having a diameter from 0.5 mm., to about 2.0 mm., exhibiting an inward crystal growth into the partially hollow portion thereof.

Example II

Approximately 39 lbs. of molten technical grade pentachlorophenol, maintained at a temperature of about 179° C., was sprayed under an inert gas pressure, through a single orifice nozzle, into a vertical 38 foot column of about 3 feet in diameter. The spray was directed upward in the column allowing the droplets to fall downwardly against an upward air flow of about 3 feet per/sec. introduced at the bottom of the column, said air in the air flow having a temperature of about 0° C. About 34 lbs. of uniform, partially hollow, spherical pellets of about $\frac{1}{16}$ inch diameter, having an inward crystaline growth into the hollow thereof, were collected at the bottom of the column with a minimum of fine particles.

Bisphenol A upon being treated in a similar way using the same general procedure and equipment as in the above examples also produced uniform partially hollow pellets.

I claim:

1. A method of pelleting substituted phenols, solid at room temperature, which comprises, introducing molten droplets of said compound into the upper portion of a vertical column, having an upward air flow therethrough from the bottom of said column, allowing said droplets to fall downwardly through the column against said air flow, and removing the so-formed solidified pellets from the bottom of the column.

2. The method of claim 1 wherein, the molten substituted phenol is at a tempreature within 10 centigrade degrees above its melting point.

3. The method of claim 1 wherein, the height of the vertical column is from about 40 to about 100 feet.

4. The method of claim 1 wherein, the temperature of the air in the upward air flow is below about 29° C.

5. The method of claim 1 wherein, the molten substituted phenol is introduced as substantially uniform droplets of the desired resulting pellet size into the vertical column.

6. A method of pelleting substituted phenols, solid at room temperature, which comprises, introducing substantially uniform molten droplets of the desired resulting pellet size of said compound, at a temperature within 10 centigrade degrees above its melting point, into the upper portion of a vertical column from about 40 to about 100 feet in length, having an upward air flow therethrough from the bottom of said column, allowing said droplets to fall downwardly through the column against said air flow, and removing the so-formed solidified pellets from the bottom thereof.

7. A method of pelleting pentachlorophenol which comprises, introducing substantially uniform molten droplets of pentachlorophenol corresponding to the desired resulting pellet size, at a temperature within 10 centigrade degrees above its melting point, into the upper portion of a vertical column having an upward air flow therethrough from the bottom of said column, allowing said droplets to fall downwardly through the column against said air flow and removing the so-formed solidified pellets from the bottom of the column.

8. The method of claim 7 wherein, the upward air flow is at a rate of about 3 feet per second.

9. The method of claim 7 wherein, the temperature of the air is the upward airflow is below about 29° C.

10. The method of claim 7 wherein, the height of the vertical column is from about 40 to about 100 feet.

References Cited by the Examiner
UNITED STATES PATENTS

| | | | |
|---|---|---|---|
| 2,563,815 | 8/1951 | Bruce | 260—623 |
| 2,601,642 | 6/1952 | Stammer et al. | 264—13 |
| 2,790,201 | 4/1957 | Eilbracht et al. | 264—13 XR |
| 2,898,625 | 8/1959 | Chao | 18—2.7 |
| 2,921,335 | 1/1960 | Bowers et al. | 18—2.7 |
| 2,939,781 | 6/1960 | Gilliam | 264—13 XR |
| 2,957,763 | 10/1960 | Barnes | 264—13 |
| 3,051,761 | 8/1962 | MacBeth et al. | 260—623 |

ALEXANDER H. BRODMERKEL, *Primary Examiner.*

MORRIS LIEBMAN, *Examiner.*